(12) United States Patent
Sadeghi et al.

(10) Patent No.: US 10,635,393 B2
(45) Date of Patent: Apr. 28, 2020

(54) BUFFER-RELATED USB COMMUNICATION

(75) Inventors: Bahareh Sadeghi, Portland, OR (US); John S. Howard, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 242 days.

(21) Appl. No.: 13/976,691

(22) PCT Filed: Mar. 29, 2012

(86) PCT No.: PCT/US2012/031173
§ 371 (c)(1),
(2), (4) Date: Oct. 29, 2013

(87) PCT Pub. No.: WO2013/147789
PCT Pub. Date: Oct. 3, 2013

(65) Prior Publication Data
US 2014/0047141 A1    Feb. 13, 2014

(51) Int. Cl.
*G06F 5/12*     (2006.01)
*G06F 13/42*    (2006.01)

(52) U.S. Cl.
CPC ............ *G06F 5/12* (2013.01); *G06F 13/4291* (2013.01)

(58) Field of Classification Search
CPC combination set(s) only.
See application file for complete search history.

(56) References Cited

U.S. PATENT DOCUMENTS

| 5,737,563 | A | * | 4/1998 | Shigeeda | G06F 1/1616 |
| | | | | | 365/230.03 |
| 6,715,055 | B1 | * | 3/2004 | Hughes | 711/170 |
| 2003/0043771 | A1 | | 3/2003 | Mizutani et al. | |
| 2008/0028113 | A1 | * | 1/2008 | Guo et al. | 710/104 |
| 2008/0162753 | A1 | | 7/2008 | Liu et al. | |
| 2010/0146279 | A1 | | 6/2010 | Lu et al. | |

(Continued)

OTHER PUBLICATIONS

International Search Report, PCT/ISA/210, dated Nov. 5, 2012, total of 3 sheets.

(Continued)

*Primary Examiner* — Ilwoo Park
*Assistant Examiner* — Juanito Borromeo
(74) *Attorney, Agent, or Firm* — Schwegman Lundberg & Woessner, P.A.

(57) ABSTRACT

According to various embodiments, apparatuses and methods to communicate buffer allocation information are presented. The disclosed apparatuses and methods may include transmitting a buffer message by a wireless USB device to a wireless USB host, which may indicate an available storage space in a buffer of the USB device to store data from the USB host. The buffer message may be transmitted independent of whether or not the USB device has received a request message (e.g., from the USB host) for information relating the available storage space in the buffer. Additionally, the buffer message may be transmitted independent of any data exchange mechanism between the USB host and the USB device. The USB device may receive a data packet from the USB host, and transmit a data packet acknowledgement message including data packet status information, and information regarding the available storage space in the buffer.

8 Claims, 3 Drawing Sheets

(56) References Cited

U.S. PATENT DOCUMENTS

2011/0072163 A1\* 3/2011 Desai .................... G06F 13/426
710/5
2011/0072284 A1 3/2011 Lyra et al.

OTHER PUBLICATIONS

"International Application Serial No. PCT/US2012/031173, International Preliminary Report on Patentability dated Oct. 9, 2014", 9 pgs.
"International Application Serial No. PCT/US2012/031173, Written Opinion dated Nov. 5, 2012", 7 pgs.

\* cited by examiner

BUFFER-RELATED USB COMMUNICATION

FIELD

This disclosure relates generally to data transfer based on universal serial bus (USB) techniques and, more particularly, to wireless communications about buffer allocation in USB systems.

BACKGROUND

Existing solutions for wireless USB communication typically include buffer management mechanisms, e.g., based on a wireless USB host managing the buffer usage on an associated wireless USB device. Such host-controlled buffer management techniques may be inefficient as buffer space allocation directed by the host for one or more data transfers from the host to the device is generally static in nature for the course of data transfers. Moreover, typically, the host may not be provided any information relating the current state (e.g., updated available space) of the device buffer during a data transfer. Accordingly, the static and strict buffer allocation may hamper a constant flow of data from the host to the device and/or discourage a dynamic adjustment of the rate of data transfer, and as such, may result in less than maximum throughput for the USB data transfer.

For example, some of the existing buffer management solutions include the device to pre-allocate its buffer space on a static basis, and communicate the total buffer space (or the pre-allocated portion) and the number of outstanding data transfer requests that the device can handle to the host. The host may then ensure that the buffer space is not overridden or overburdened by the transmitted data. However, the pre-determined number of requests and pre-allocated buffer space result in limited over-the-air transfer efficiency as well as sub-optimal utilization of the buffer space on the device (which may indeed require some over-provisioning of the buffer space).

DETAILED DESCRIPTION

Figure 1:
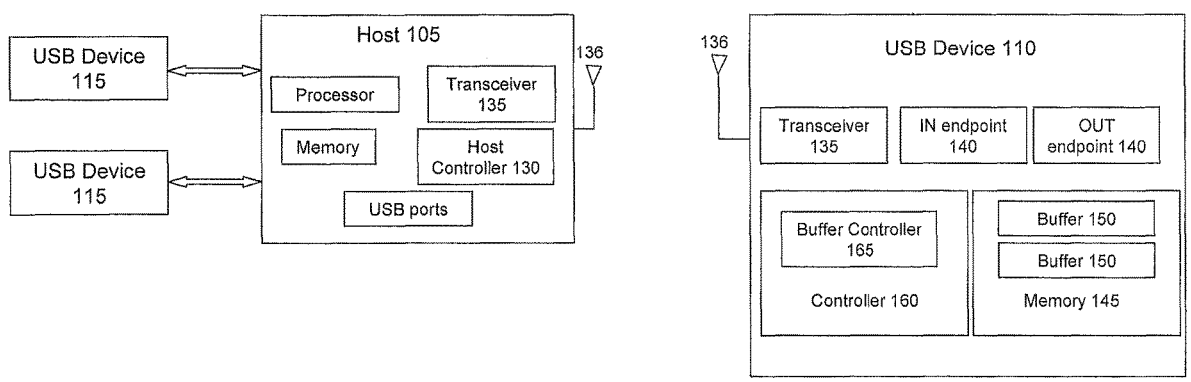
FIG. 1 illustrates an example of a wireless USB system including a wireless USB device according to various embodiment of the present disclosure.

In the description that follows, like components have been given the same reference numerals, regardless of whether they are shown in different aspects. To illustrate one or more aspect(s) of the present disclosure in a clear and concise manner, the drawings may not necessarily be to scale and certain features may be shown in somewhat schematic form. Features that are described and/or illustrated with respect to one aspect may be used in the same way or in a similar way in one or more other aspects and/or in combination with or instead of the features of the other aspects of the technology disclosed herein.

In accordance with various embodiments of the present disclosure, in order to increase the utilization efficiency of the buffer space on the device and increase the over-the-air throughput performance, a USB device, e.g., a wireless-enabled USB device or a USB device configured with wireless serial bus extension (hereinafter referred to as a "wireless USB device"), which is communicatively coupled to a USB host, is responsible for the management of its buffer and buffer allocation for USB data transfers. The USB host, like the wireless USB device, in addition to being configured to operate according to a USB protocol, may also be enabled to wirelessly communicate with the wireless device and be arranged to participate in the (device-based) buffer management techniques disclosed herein. The terms "host," "USB host," "wireless-enabled USB host," and "wireless USB host" are used interchangeably hereinafter in this disclosure. Specifically, techniques that relate to communicating, between a wireless USB host and a wireless USB device, allocation of the device buffer, as discussed herein, may include an "out-of-band" message exchange (i.e., independent of an exchange of USB data signals or packets) between a USB device and an associated USB host, and/or an "in-band" message exchange (i.e., as part of a USB data signal or packet exchange) between the USB device and the USB host. The out-of-band and in-band messages may provide an indication to the USB host regarding a state (e.g., available storage space) of the device buffer before a data transfer begins, or during a data transfer. In some embodiments, the buffer allocations for USB data transfer is communicated to the host in order to commence data transfer.

In broad overview, apparatuses and methods in accordance with various embodiments of the present disclosure may be implemented in connection with devices configured to communicate (e.g., wirelessly) with a host based on the USB protocol. The wireless communication between the USB device and the USB host may be based on a wireless protocol, e.g., based on the IEEE 802.11 standard, or WiGig specification. Alternatively, such communications may achieved via wired interfaces, e.g., an Ethernet interface.

In accordance with various embodiments of the present disclosure, a method for communication between a USB host (e.g., a wireless USB host) and a USB device (e.g., a wireless USB device) regarding allocation of a device buffer is disclosed. The method may include transmitting a buffer message by a USB device to the USB host. The buffer message may indicate an available storage space in a buffer of the USB device to store data received from the USB host. In some embodiments, the buffer message is transmitted independent of whether or not the USB device has received a request message for information relating the available storage space in the buffer. Additionally, or alternatively, the buffer message may be transmitted independent of a data exchange mechanism between the USB host and the USB device. The data exchange mechanism may include exchange of messages related to a data transfer (e.g., data signals or packets, and associated acknowledgement or response messages) between the USB device and USB host.

The method may further include receiving an acknowledgement message at the USB device that indicates that buffer message has been received at the USB host. The method may also include transmitting initialization information by the USB device to the USB host to establish a connection therewith, prior to the operation related to transmitting the buffer message. In some embodiments, the method includes receiving the request message from the USB host for information about the available buffer space at the USB device (and as such, the buffer message is transmitted to the USB host in response to the request message).

The request message may include a size estimate of a data transfer that the USB host intends to transmit to the USB device.

In some embodiments, the method further includes receiving a data packet from the USB host at the USB device, and in response, transmitting a data packet acknowledgement message from the USB device. For example, the data packet acknowledgement message may include status information indicating whether or not the data packet has been successfully received at the USB device, and updated (or current) information regarding the available storage space in the buffer.

In accordance with various embodiments of the present disclosure, another method for communication between a (wireless) USB host and a (wireless) USB device regarding device buffer allocation is disclosed. This method may include receiving, by a USB device configured to communicate with a USB host, a data packet from the USB host. The USB device may include a buffer to store data received from the USB host including the received data packet. The method may further include transmitting a data packet acknowledgement message by the USB device to the USB host. The data packet acknowledgement message may include status information indicating whether or not the data packet has been successfully received at the USB device, and information regarding a current available storage space in the device buffer.

In some embodiments, the method further includes, transmitting a buffer message from the USB device to the USB host. The buffer message may indicate an available storage space in the device buffer. The buffer message may be transmitted independent of whether or not the USB device has received a request message for information relating the available storage space in the buffer (e.g., from the USB host). Further, the buffer message may be transmitted independent of a data exchange mechanism between the USB host and the USB device. The data exchange mechanism may include at least the aforementioned operations of receiving the data packet and transmitting the data packet acknowledgement message. In some embodiments, this buffer-related communication between the host and device takes place prior to the receipt of the data packet at the device (and before the transmission of the associated acknowledgement message to the host). As such, the buffer message indicating an available device buffer space transmitted from the device to the host before commencing the data exchange may be considered as an "initial" or "startup" buffer message. Alternatively, in some embodiments, the host may assume an "initial" buffer allocation at the device buffer, and start a data transfer to the device based on that assumption. The device may then update the host with information regarding the available buffer space using the mechanisms discussed above, i.e., as part of the data exchange (within an acknowledgement message), or in a message independent of the data exchange (and independent of whether or not such buffer message was requested by the host).

In accordance with various embodiments of the present disclosure, an apparatus for communicating between a (wireless) USB host and a (wireless) USB device regarding device buffer allocation is presented. The apparatus may include a buffer, a buffer controller, and a transceiver. The buffer may be configured to store data received from a USB host. The buffer controller may be configured to manage the buffer, e.g., the buffer controller may be configured to generate a buffer message indicating an available storage space in the buffer. In some embodiments, the buffer message is generated independent of whether or not the buffer controller, the transceiver, or both have received a request message (e.g., from the USB host) for information relating the available storage space in the device buffer. In some embodiments, the buffer message indicates the available buffer space in terms of a pre-defined unit of buffer space or "credit," e.g., one unit or credit being equal to 4 KB (or 8 KB, or any other size) of buffer space. The transceiver may be configured to transmit and receive radio frequency signals using a wireless protocol, e.g., including the IEEE 802.11 standard or WiGig specification, and may be communicatively coupled to the buffer controller. Using the wireless communication capabilities, the transceiver may be configured to transmit the buffer message to the USB host. In some embodiments, the buffer message may be transmitted independent of a data exchange mechanism between the USB host and the apparatus. The data exchange mechanism may include exchange of messages related to a data transfer (e.g., data signals or packets, and associated acknowledgement or response messages) between the USB host and the apparatus. In such cases where the buffer message is transmitted independent of the data exchange mechanism, the buffer message may be transmitted either as an independent message solely containing information regarding the device buffer, or within (i.e., piggybacking) a management or control message of the USB communication protocol between the host and the device.

In some embodiments, the apparatus is further configured to receive an acknowledgement message from the USB host indicating that the buffer message has been received at the USB host. In some embodiments, the buffer controller, the transceiver, or both are further configured to receive the request message for information relating the available storage space in the buffer from the USB host. The request message may include a size estimate of an intended data transfer from the USB host to the apparatus.

In some embodiments, the transceiver is configured to receive a data packet from the USB host, and, responsive to the reception of the data packet, the buffer controller is further configured to generate a data packet acknowledgement message for the USB host. The data packet acknowledgement message may include status information indicating whether or not the data packet has been successfully received, and updated information regarding the available storage space in the buffer. The data packet acknowledgement message may then be transmitted by the transceiver to the USB host.

In accordance with various embodiments of the present disclosure, another apparatus for communicating between a (wireless) USB host and a (wireless) USB device regarding device buffer allocation is presented. This apparatus may include a buffer, a transceiver, and a buffer controller. The buffer may be configured to store data received from a USB host. The transceiver may be configured to transmit and receive radio frequency signals using a wireless protocol, e.g., including the IEEE 802.11 standard or WiGig specification. In some embodiments, the transceiver is configured to receive one or more data packets from the USB host. The buffer controller may be configured to manage the buffer and be communicatively coupled to the transceiver. Further, responsive to the reception of the data packet(s), the buffer controller may be configured to generate a data packet acknowledgement message for the USB host. The data packet acknowledgement message may include status information indicating whether or not the data packet has been successfully received, and information regarding a current available storage space in the buffer. In some embodiments, the transceiver is further configured to transmit the data packet acknowledgement message to the USB host.

In some embodiments, the buffer controller is further configured to generate a buffer message indicating an available storage space in the buffer (e.g., before the aforementioned reception of the one or more data packets from the USB host). The buffer message may be generated independent of whether or not the buffer controller, the transceiver, or both have received a request message for information relating the available storage space in the buffer. Further, the buffer message may be generated independent of the reception of the data packets. In some embodiments, the transceiver is further configured to transmit the buffer message to the USB host independent of a data exchange mechanism between the USB host and the apparatus. The data exchange mechanism may include at least the aforementioned operations of receiving the at least one data packet from the USB host, and transmitting the data packet acknowledgement message to the USB host.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Turning now to the various aspects of the disclosure, FIG. 1 depicts a non-limiting example of a system, such as system 100, for wireless USB communication in which buffer management techniques described herein may be implemented, in accordance with various embodiments of the present disclosure. As shown, system 100 may include a USB host 105, and USB devices 110, 115. USB host 105 may be operatively and communicatively coupled with (a number of endpoints of) USB devices 110, 115 to exchange USB data and messages in wireline or wireless fashion, in accordance with a USB protocol. In other words, USB host 105 and USB device 110, 115 may be configured to operate according to the USB protocol. Such USB protocol may be based on, e.g., USB standards USB 1.0 (released in 1996, 1998), USB 2.0 (released in April 2000) or USB 3.0 (released in November 2008), wireless USB specification 1.1 (published on Sep. 9, 2010), and/or other USB standards or specifications. It will be appreciated that, although one USB host 105 and one device 110 are shown in system 100, various aspects of the disclosure can relate to other number of USB hosts and USB devices, as can be contemplated by one of ordinary skill in the art after reading this disclosure. Further, USB host 105 may be connected with a USB hub (not shown) which may provide USB ports for other USB devices to connect therewith. The USB hub may be another wireless device similar to USB Device 110 that provides USB ports for other devices to be connected to it, and may or may not have integrated USB endpoints. USB host 105 may be configured to also communicate with the USB hub and its associated USB devices based on the USB protocol (implemented within system 100).

In some embodiments, as is typical in a USB system, host 105 is responsible for detecting the attachment and removal of USB devices, managing control flow between the host and USB devices, managing data flow between the host and USB devices, collecting status and activity statistics, and providing a limited amount of power to attached USB devices. For example, host 105 may be configured to control all communications on a USB bus, and only one USB device 110, 115 may communicate with host 105 at a time. When a USB device is first connected to host 105, host 105 may detect its presence and request basic information from the device such as communication speeds supported by the device, the bandwidth required by the device, type of data utilized or supported by the device, and/or other initialization information. The initialization process is referred to as enumeration, and includes the host assigning a unique address to the device. Generally, interactions between a USB host and a USB device include device enumeration and configuration, isochronous data transfers, asynchronous data transfers, power management, and device and bus management information.

USB host 105 may include a computing or electronic device including, but not limited to, a desktop person computer (PC), a mobile computing device (e.g., a smartphone with computing capabilities, a tablet computer), or any other computing device, configured for USB communication with a USB device (or hub). In general, USB host 105 may include a microprocessor, a memory (including a buffer to temporarily store USB data until the host is ready to process the data) and/or other components. In some embodiments, in accordance with the USB protocol, USB host 105 is configured to communicate or interact with a USB device (e.g., devices 110, 115) or hub through a host controller 130 associated with (or implemented within) host 105. Host controller 130 may be configured to control and manage the use and/or operation of a USB bus and one or more USB ports of host 105, and may be arranged to interface with an internal bus (e.g., PCI bus) of host 105. Host controller 130 may be implemented in a combination of hardware, firmware, and/or software to comply with the USB protocol.

Typically, host 105 may also include a transceiver 135 to wirelessly transmit and receive data and messages (in form of radio frequency (RF) signals). Transceiver 135 may be connected to a USB port of host 105, and to an antenna 136 which transmits and receives RF signals for transceiver 135. Alternatively, instead of being connected to a USB port, transceiver 135 may be connected to the host system via other interfaces including interfaces based on PCI, PCIe, AMBA, etc. Further, transceiver 135 may include other hardware, software and/or firmware modules (e.g., related to a modulator, a demodulator, a channel codec, etc.) implemented therein to enable transceiver 135 for wireless communication, as will be apparent to one of ordinary skill in the art. Transceiver 135 of host 105 may be operatively-compatible with (or same as) a transceiver of a USB device (discussed below) such that the USB host and USB device are able to communicate wirelessly. In some embodiments, transceiver 135 is configured for wireless communication based on WiFi standard, WiGig specification and/or other wireless standards and protocols that are well known to one of ordinary skill in the art. In some embodiments, the functionality of a wireless transceiver is achieved via a Host Wire Adapter that is connected to USB host 105, e.g., through a USB connection.

In some embodiments, USB devices 110, 115 of system 100 are functions or peripheral devices for host 105, which are capable of exchanging USB data, management and control information with host 105. USB devices 110, 115 may include, but not limited to, printers, digital cameras, speakers, mice, joysticks, microphones, external hard drives, data storage and/or other devices, and/or other computing devices including phones (e.g., smartphones), PDAs, tablet computers, laptop or personal computers that share their peripherals with host 105. The peripherals may be embedded (e.g., a camera on the phone which serves as a virtual USB device), or not embedded (e.g., connected via USB to the computing device) in the computing device. In some embodiments, device 110 is a Device Wire Adapter (DWA) which provides one or more connection points for other wired USB devices (e.g., devices 115) to connect therewith. Generally, devices 110, 115 include a standard USB interface that understands the USB protocol of system 100, and operates (e.g., transmits and receives USB data and other control messages and information) accordingly. For example, in accordance with the USB protocol, devices 110, 115 may provide configuration, capability and reset information to host 105, and otherwise comply with the USB protocol. Host 105 may be able to access devices 110, 115 using the addresses that host 105 assign when the devices are attached and enumerated by host 105. In some embodiments, one or more of devices 110, 115 also include components and features to operate as a host for other devices. For example, in addition to the components and modules (discussed below) that relate to device functionalities and features, device 110 (or device 115) may also include host controller 130, transceiver 135 and/or other components and modules of host 105. Such host-related modules in device 110 (or 115) may be hidden from (or be inaccessible to) host 105, but may be used to provide USB ports for other devices to connect therewith.

In some embodiments, as is typical in a USB system, devices 110, 115 include endpoints 140. Each endpoint 140 is a uniquely addressable portion of a device that is considered the terminus of communication flow between a host (e.g., host 105) and the device (e.g., devices 110, 115), and is utilized for transmitting and receiving data over the USB bus. Each device may include a plurality of addressable endpoints (e.g., 31 endpoints), and each endpoint (e.g., endpoint 140) is identified by an endpoint number and a direction. Typically, the endpoint number and endpoint direction reference an endpoint buffer (e.g., buffer 150 of memory 145) or register within the device, and the endpoint direction defines if the data is traveling to or from the host, with the reference being from the host's point of view. Hence, an "IN endpoint" is an endpoint that is transmitting data from the device to the host, and an "OUT endpoint" is an endpoint that receives data at the device from the host. In general, the communication exchange (including data and control information) between a host (e.g., host 105) and a device (e.g., device 110) that is initialized or set up during enumeration is referred to as a "pipe" which is a virtual connection between a device's endpoints and the device's controlling software or drivers that are located in the host. The pipe is a pathway for all data and information exchanged between the host and the device.

In some embodiments, device 115 is coupled and configured to communicate with host 105 using a wireline (e.g., USB, or non-USB) connection, and device 110 is configured to wirelessly communicate and exchange data and information with host 105. As a non-limiting example, techniques disclosed herein that relate to communicating buffer-related information are described with respect to wireless device 110. In some embodiments, device 110 includes a wireless transceiver 135, and/or other wireless transmitter/receiver module for communicating via established pipes with host 105. Transceiver 135 of device 110 may be operatively-compatible and similar in structure, functionality and features as transceiver 135 of host 105 discussed above. Transceiver 135 of device 110 may be connected with antenna 136 of device 110 to transmit and receive RF signals.

Further, device 110 includes memory 145 which may further include buffers 150. Each buffer 145 may be associated with an endpoint 140 to temporarily store data directed to or from that endpoint 140. For example, for an OUT endpoint 140, an associated buffer 150 may store data received from host 105 before being provided to that OUT endpoint 140. Similarly, for an IN endpoint 140, an associated buffer 150 may store data received from that IN endpoint 140 before being transmitted to host 105. Each buffer 150 may have limited, pre-determined and fixed storage capacity. Alternatively, the total buffer space of buffers 150 may be on-the-fly divided or allocated among endpoints 140, and such allocations may be dynamically updated or adjusted based, e.g., on the number of active endpoints 140, amount of activity at endpoints 140, and/or other factors. Memory 145 may include other registers and storage space to store data and/or control information to/from host 105, in accordance with the USB protocol. In some embodiments, memory 145 and buffer 150 (and memories or storage of host 105 and devices 115) are of one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device.

In some embodiments, device 110 further includes a controller 160 that is operatively coupled with transceiver 135, endpoints 140, and memory 145 and buffers 150. For example, controller 160 may be configured to control endpoints 140, and transceiver 135. In some embodiments, controller 160 includes a buffer controller 165 to control buffers 150, and provide buffer management in accordance with techniques described herein (e.g., with respect to FIGS. 2 and 3). Controller 160 and buffer controller 165 may be implemented in hardware, firmware, and/or software, to perform control and management (e.g., buffer management) techniques described herein.

For clarity, resources and/or components of system 100 not required or related to techniques or processes of buffer management in USB communications are not shown in FIG. 1. However, those resources, components and/or modules (and functions performed by them) will be appreciated by a person of ordinary skill in the art as being part of system 100. Also, one or more modules or components of system 100 (e.g., of host 105, devices 110, 115), or other components that a module or component of system 100 may be connected with (not shown in figures) may include one or more processors and/or individual memory modules, to perform the functions and processes described herein. Although the modules in FIG. 1 are shown as individual components or elements, in one or more embodiments, those modules may be combined into one or more devices, one or more software programs, or one or more circuits on one or more chips. In some embodiments, some modules or components of system 100 may be part of a system which is located geographically remotely from the rest of the modules or components of system 100. In such a case, the remotely located groups of modules may be operatively connected with each other through a wired or wireless network (not shown) using necessary interfaces and components. Such network may include one or more of a private TCP/IP network, the Internet, or a private or public radio frequency (RF) network.

In some embodiments, one or more modules of system 100 are realized in one or more programmable devices such as a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Alternatively, or additionally, one or more modules of system 100 may be implemented in software stored on an article of manufacture (e.g., floppy disks, CDs, hard disks, flash drives, etc.) to enable a general-purpose processor to perform the specific functions described herein, or combination of hardware and software. The processors or controllers described herein may be one or more microprocessors or microcontrollers such as those made by Intel Corporation of Santa Clara, Calif. (although other vendors may be used). In one example, the processors or controllers may form a compute complex on a circuit board and may include one or more microprocessor units, or any other combination of logic circuits capable of executing the functionality and methodologies of the USB host and one or more USB devices (e.g., USB device 110). Moreover, such combination of microprocessor units and logic circuitry may be implemented as separate components or may be integrated on to a single platform.

Figure 2A:
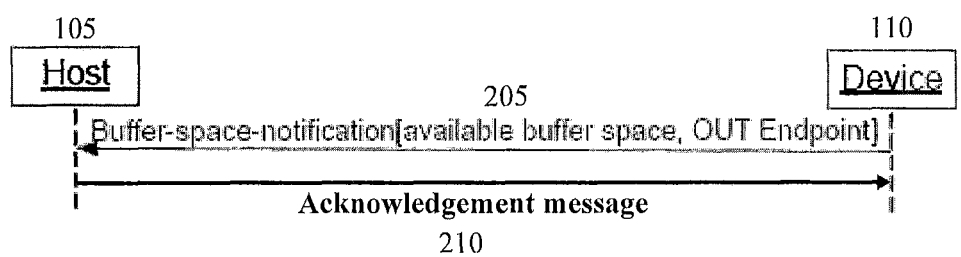
FIGS. 2a and 2b each illustrates a message exchange for "out-of-band" buffer management in accordance with various embodiments of the present disclosure.
Figure 2B:
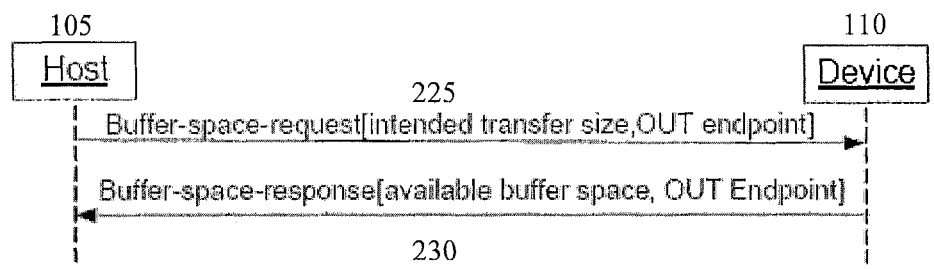
Figure 3:
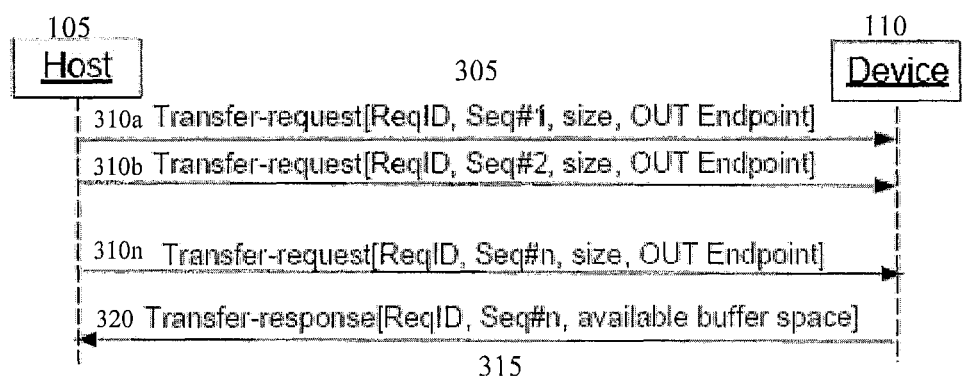
FIG. 3 illustrates a message exchange for "in-band" buffer management in accordance with various embodiments of the present disclosure.

Referring now to FIGS. 2*a*, 2*b* and 3 which depict message or information exchanges between a host (e.g., host 105) and a device (e.g., device 110) related to buffer allocation at the device, in accordance with various embodiments of the present disclosure. Specifically, FIGS. 2*a* and 2*b* each illustrates an "out-of-band" message exchange between the host and device for communication of buffer allocation at the device, and FIG. 3 illustrates an "in-band" message exchange between the host and device regarding device buffer allocation.

In the context of buffer-related communications described herein, an "out-of-band" message (or information) exchange means transmission and reception of one or more messages solely containing information regarding the buffer at the device (or host), or control or management messages relating USB communication that also include buffer-related information (in other words, buffer-related information is piggybacking on the control or management messages). The "out-of-band" message exchange is considered independent of any data-related exchange protocol, e.g., transmission and reception of any data (e.g., USB data) and associated responses or acknowledgements.

Further, in the context of buffer-related communications described herein, an "in-band" message (or information) exchange means transmission and reception of buffer-related information within or as part of the data-related message exchange between the host and the device. For example, under the "in-band" message exchange, buffer information may piggyback on (a data message or) a data acknowledgement message from the device to the host. In some embodiments, exchange of buffer information piggybacked on the control or management messages, instead of being considered as the "out-of-band" message exchange (as discussed above), is considered as the "in-band" message exchange.

Both the out-of-band and in-band message exchanges may be performed using the same communication (e.g., wireless) protocol established between the host and the device.

In some embodiments, the out-of-band buffer communication technique is used at an initial stage of communication between the host and the device, e.g., when a connection is first established between the host and the device. At such initial stage, the host (e.g., host 105) may have no information about the availability of the buffer space (e.g., in buffer 150) on the device to transfer data thereto (or specifically, e.g., to an OUT endpoint 140 of device 110). Accordingly, the out-of-band communication techniques described herein may be employed to inform the host about the "initial" or "startup" buffer allocation at the device buffer. Alternatively, in some embodiments, the host may assume an "initial" buffer allocation at the device buffer, and start a data transfer to the device based on that assumption. The device may then update the host with information regarding the current or updated available buffer space using the out-of-band techniques (and/or in-band techniques) disclosed herein.

In some embodiments, the out-of-band buffer communication technique includes a push mechanism, a pull mechanism, or both. In a push mechanism 200 of the out-of-band buffer communication technique (FIG. 2*a*), in operation 205, the device (e.g., using buffer controller 165 of device 110) may generate an unsolicited buffer message and send it using transceiver 135 to the host (e.g., host 105), after the initial connection (e.g., via enumeration) is established with the host. In the context of the buffer communication techniques described herein, an "unsolicited" message indicates that such message, e.g., from device 110, was not requested, e.g., by host 105. The buffer message may include buffer information (e.g., an available storage space in buffer 150). In some embodiments, the buffer message indicates the available buffer space in terms of a pre-defined unit of buffer space or "credit," e.g., one unit or credit being equal to 4 KB (or 8 KB, or any other size) of buffer space. In some embodiments, the buffer information transmitted in the buffer message relates one or more specific endpoints 140, or in general, to the total buffer space.

Further, in some embodiments, in operation 210, host 105 sends an acknowledgement response message to device 110 (received at transceiver 135), the acknowledgement response message indicating that the buffer message has been received at the host 105. In some embodiments, because of the unsolicited nature of the buffer message, the push mechanism reduces the latency in start of a data transfer, e.g., from host 105 to device 110.

In a pull mechanism 220 of the out-of-band buffer communication technique (FIG. 2*b*), e.g., before the start of an OUT transfer, in operation 225, host 105 may send a buffer information request message to device 110. The request message may include an estimate of a size of the intended OUT data transfer (from host 105 to device 110, or specifically, to an OUT endpoint 140). In operation 230, device 110 may reply to the request message with a buffer message generated, e.g., using buffer controller 165. The buffer message may include buffer information, e.g., an available storage space in buffer 150 for the intended OUT transfer. In some embodiments, the pull mechanism allows for accurate information delivered to the host on demand, e.g., before the start of an OUT transfer.

Turning now to FIG. 3 which illustrates an in-band buffer communication technique 300. In general, in in-band technique 300, information regarding buffer allocation at the device (e.g., information regarding available buffer space) in provided within data messages exchanged between the host and the device. However, in some embodiments, exchange of buffer allocation information is piggybacked on the control or management messages is considered as the "in-band" message exchange. In some embodiments, in in-band technique 300, buffer information is provided as an extension of the over-the-air data streaming protocol with flow control. In some embodiments, the in-band message exchange 300 for buffer management technique is applied in USB system 100 following the out-of-band message exchange (described above). The buffer information provided in this in-band message exchange technique may indicates the total available buffer space in terms of a pre-defined unit of buffer space or "credit," e.g., one unit or credit being equal to 4 KB (or 8 KB, or any other size) of buffer space. The buffer information may be specifically related to one or more particular endpoints 140.

As illustrated in FIG. 3, host 105 may initiate an OUT transfer request. For an OUT transfer to device 110, in operation 305, the host may create and send a request message 310 to device 110. The request message 310 may include a request ID, the size of the OUT data transfer, the data (e.g., USB data), and the address of a target USB OUT endpoint 140. If the size of request message 310 is larger than what is allowed by the wireless medium, request 310 may be divided into multiple packets 310a-310n prior to transmission over the wireless channel to device 110, each packet 310a-310n being identified by a sequence number. In order to increase the over-the-air efficiency of the data transfer, host 105 may then send as many back-to-back data packets 310 as device 110 is capable of buffering, e.g., in buffer 150.

In operation 315, device 110, after processing of each of (or multiple) received packets 310a-310n, using controller 160 or buffer controller 165, generates and sends at least one data packet acknowledgement message 320 to host 105. The message 320 may include status feedback information about whether the request packet(s) 310a-310n was successfully received at device 110, or there has been an error. In some embodiments, buffer controller 165 extends the data packet acknowledgement message 320 by appending buffer space information (of buffer 150) therewith. For example, the appended buffer space information may include a current or most updated information about available space (e.g., in terms of byte count) in buffer 150, e.g., at time of transmission of the acknowledgement message 320. During the on-going data packet transmission, host 105 may then update its information of the available buffer space on device 110, and continues with transmissions of data packet 310a-310n to maximally utilize the buffer space available on device buffer 150.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A non-transitory machine-readable medium that stores instructions for execution by one or more processors to configure a universal serial bus (USB) device to:
    buffer data received from a USB host before transmission of the data to an endpoint of the USB device;
    decode a request message, received from the USB host, that requests information regarding endpoints of the USB device; and
    encode, for transmission to the USB host in response to the request message, a response message that indicates a buffer size available to transfers that target a respective endpoint of the USB device, the message further including identification information for the respective endpoint.

2. The transitory machine-readable medium of claim 1, wherein the instructions when executed by the one or more processors configure the device to:
    decode a transfer request message, received from the USB host, the transfer request message including a data payload to be transferred and a size of the data payload to be transferred; and
    encode, for transmission to the USB host, a transfer response message that includes a field to indicate a remaining buffer size available, the remaining buffer size available being based on the size of the data payload to be transferred.

3. The transitory machine-readable medium of claim 2, wherein the transfer request message includes an identifier of the transfer request and a sequence number of a data packet corresponding to the transfer request.

4. The transitory machine-readable medium of claim 2, wherein the transfer response message includes an indication as to whether the request packets were successfully received at the USB device.

5. The transitory machine-readable medium of claim 4, wherein the instructions when executed by the one or more processors configure the device to:
    provide the packets to the respective endpoint of the USB device.

6. The transitory machine-readable medium of claim 1, wherein the instructions when executed by the one or more processors configure the device to:
    provide initialization information to the USB host to establish a connection with the USB host prior to receiving the data to be buffered.

7. A method of operating a universal serial bus (USB) device, the method comprising:
    buffering data received from a USB host before transmission of the data to an endpoint of the USB device;
    receiving a request message from the USB host that requests information regarding endpoints of the USB device; and
    transmitting a response message to the USB host in response to the request message that indicates a buffer size available to transfers that target a respective endpoint of the USB device, the message further including identification information for the respective endpoint.

8. The method of claim 7, further comprising:
    receiving a transfer request message from the USB host, the transfer request message including a data payload to be transferred, a size of the data payload to be transferred, an identifier of the transfer request and a sequence number of a data packet corresponding to the transfer request; and
    transmitting a transfer response message to the USB host that includes a field to indicate a remaining buffer size available, the remaining buffer size available being based on the size of the data payload to be transferred, and an indication as to whether the request packets were successfully received at the USB device.

* * * * *